United States Patent
Lundby et al.

(10) Patent No.: US 7,680,084 B2
(45) Date of Patent: *Mar. 16, 2010

(54) METHOD AND APPARATUS FOR PROVIDING ORTHOGONAL SPOT BEAMS, SECTORS, AND PICOCELLS

(75) Inventors: Stein A. Lundby, San Diego, CA (US); Joseph P. Odenwalder, Del Mar, CA (US); Edward G. Tiedemann, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 636 days.

This patent is subject to a terminal disclaimer.

(21) Appl. No.: 11/405,951

(22) Filed: Apr. 17, 2006

(65) Prior Publication Data

US 2006/0209808 A1    Sep. 21, 2006

Related U.S. Application Data

(63) Continuation of application No. 09/852,389, filed on May 9, 2001, now Pat. No. 7,031,282, which is a continuation of application No. 08/925,521, filed on Sep. 8, 1997, now Pat. No. 6,285,655.

(51) Int. Cl.
*H04B 7/216* (2006.01)
*H04B 1/00* (2006.01)
(52) U.S. Cl. .................. 370/335; 370/342; 375/130; 375/135; 375/136; 375/146; 375/147
(58) Field of Classification Search .......... 370/335, 370/342; 375/130, 135–136, 146–147
See application file for complete search history.

(56) References Cited

U.S. PATENT DOCUMENTS 4,901,307 A    2/1990    Gilhousen et al.

(Continued)

FOREIGN PATENT DOCUMENTS

JP    06-501349    2/1994

(Continued)

OTHER PUBLICATIONS

Das, J. "A Technique for Improving the Efficiency of M-Ary Signaling" IEEE Transactions on Communications vol. COM-32, No. 2 (Feb. 1984).

(Continued)

*Primary Examiner*—Steven H Nguyen
(74) *Attorney, Agent, or Firm*—Kam T Tam; Larry Moskovitz

(57) ABSTRACT

A method and apparatus for providing orthogonal spot beams (14a, 14b), sectors (16a, 16b), and picocells (18), by using orthogonal auxiliary pilots and different Walsh traffic channels in adjacent areas. According to the IS-95 standard, the pilot signal is covered with the 64-chip Walsh sequence zero. Designating the 64-chip all zeros Walsh sequence as P and the 64-chip all one sequence as M, additional pilot signals are provided in the present invention by concatenating the P and the M sequences. Thus, for two pilot signals, pilot Walsh sequences of PP and PM can be used. For four pilot signals, pilot Walsh sequences of PPPP, PMPM, PPMM, and PMMP can be used. In general, the required number of pilot Walsh sequences can be generated by substituting each bit in an K-bit Walsh sequence with the 64-chip all zeros P or all ones M sequence, depending on the value of that bit.

9 Claims, 6 Drawing Sheets

U.S. PATENT DOCUMENTS

| | | | |
|---|---|---|---|
| 5,101,501 A | 3/1992 | Gilhousen et al. | |
| 5,103,459 A | 4/1992 | Gilhousen et al. | |
| 5,109,390 A | 4/1992 | Gilhousen et al. | |
| 5,414,728 A | 5/1995 | Zehavi | |
| 5,490,165 A | 2/1996 | Blakeney, II et al. | |
| 5,506,865 A | 4/1996 | Weaver, Jr. | |
| 5,528,624 A | 6/1996 | Kaku et al. | |
| 5,550,811 A | 8/1996 | Kaku et al. | |
| 5,577,022 A | 11/1996 | Padovani et al. | |
| 5,577,025 A | 11/1996 | Skinner et al. | |
| 5,621,752 A | 4/1997 | Antonio et al. | |
| 5,712,869 A | 1/1998 | Lee et al. | |
| 5,737,327 A | 4/1998 | Ling et al. | |
| 5,781,583 A * | 7/1998 | Bruckert et al. | 375/146 |
| 5,870,378 A | 2/1999 | Huang et al. | |
| 5,886,987 A | 3/1999 | Yoshida et al. | |
| 5,909,434 A | 6/1999 | Odenwalder et al. | |
| 5,933,424 A | 8/1999 | Muto | |
| 5,956,345 A | 9/1999 | Allpress et al. | |
| 6,038,263 A * | 3/2000 | Kotzin et al. | 375/299 |
| 6,141,542 A * | 10/2000 | Kotzin et al. | 455/101 |
| 6,173,005 B1 * | 1/2001 | Kotzin et al. | 375/141 |
| 6,285,655 B1 * | 9/2001 | Lundby et al. | 370/209 |

FOREIGN PATENT DOCUMENTS

| | | |
|---|---|---|
| JP | 08-095954 | 4/1996 |
| JP | 09-055693 | 2/1997 |
| JP | 10-098444 | 4/1998 |
| JP | 10-190520 | 7/1998 |
| WO | 9200639 | 1/1992 |
| WO | 9637970 | 11/1996 |
| WO | 9707646 | 2/1997 |
| WO | 9730526 | 8/1997 |

OTHER PUBLICATIONS

TIA/EIA/IS-95 Mobile Station-Base Station Compatibility Standard for Dual-Mode Wideband Spread Spectrum Cellular System, Jul. 1993.

International Search Report—PCT/US98/018713—International Seach Authority, European Patent Office, Jan. 27, 1999.

International Preliminary Examination Report—PCT/US1998/018713—International Search Authority US—Aug. 3, 2000.

Written Opinion—PCT/US98/018713—International Search Authority US—Oct. 6, 1999.

* cited by examiner

METHOD AND APPARATUS FOR PROVIDING ORTHOGONAL SPOT BEAMS, SECTORS, AND PICOCELLS

CLAIM OF PRIORITY UNDER 35 U.S.C. §120

The present Application for Patent is a Continuation of patent application Ser. No. 09/852,389, entitled "METHOD AND APPARATUS FOR PROVIDING ORTHOGONAL SPOT BEAMS, SECTORS, AND PICOCELLS" filed May 9, 2001, and will issue as U.S. Pat. No. 7,031,282 on Apr. 18, 2006, which is a Continuation of patent application Ser. No. 08/925,521, entitled "METHOD AND APPARATUS FOR PROVIDING ORTHOGONAL SPOT BEAMS, SECTORS, AND PICOCELLS" filed Sep. 8, 1997, and issued as U.S. Pat. No. 6,285,655, both assigned to the assignee hereof and hereby expressly incorporated by reference herein.

BACKGROUND OF THE INVENTION

I. Field of the Invention

The present invention relates to communications. More particularly, the present invention relates to a method and apparatus for providing orthogonal spot beams, sectors, and picocells.

II. Description of the Related Art

The use of code division multiple access (CDMA) modulation techniques is one of several techniques for facilitating communications in which a large number of system users are present. Although other techniques such as time division multiple access (TDMA), frequency division multiple access (CDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein. The CDMA system can be designed to conform to the "TIA/EIA/IS-95 Mobile Station-Base Station Compatibility Standard for Dual-Mode Wideband Spread Spectrum Cellular System", hereinafter referred to as the IS-95 standard.

The CDMA system is a spread spectrum communication system. The benefits of spread spectrum communication are well known in the art and can be appreciated by reference to the above cited references. CDMA, by its inherent nature of being a wideband signal, offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links to a mobile user or remote station through two or more base stations. Furthermore, path diversity may be obtained by exploiting the multipath environment through spread spectrum processing by allowing signals arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390 entitled "DIVERSITY RECEIVER IN A CDMA CELLULAR TELEPHONE SYSTEM," both assigned to the assignee of the present invention and incorporated by reference herein.

In a CDMA system, the forward link refers to a transmission from a base station to a remote station. In the exemplary CDMA communication system which conforms to the IS-95 standard, forward link data and voice transmissions occur over orthogonal code channels. In accordance with the IS-95 standard, each orthogonal code channel is covered with a unique Walsh sequence which is 64 chips in duration. The orthogonality minimizes the interference between the code channels and improves performance.

CDMA systems offer higher system capacity, as measured by the number of supportable users, through several design features. First, the transmit frequency of adjacent cells can be reused. Second, increased capacity can be achieved by using more directive antennas for the transmission to some areas or to some remote stations. In the CDMA system, the coverage area (or cell) can be divided into several (e.g., three) sectors using directive antennas. The method and apparatus for providing sectors in a CDMA communication system is described in U.S. Pat. No. 5,621,752, entitled "ADAPTIVE SECTORIZATION IN A SPREAD SPECTRUM COMMUNICATION SYSTEM", assigned to the assignee of the present invention and incorporated by reference herein. Each sector or cell can be further divided into more directive spot beams. Alternatively, spot beams can be assigned to selected remote stations or a set of remote stations within a sector or a cell. A picocell is a localized coverage area within a sector or a cell. The picocell can be embedded within a sector or a cell to improve capacity and provide additional services.

In the exemplary CDMA system, the forward link transmissions in different sectors typically use different short PN spreading sequences (or different offsets of a common set of short PN spreading sequences). Thus, when a remote station is in overlapping sector coverage areas and demodulating the signal from one sector, the signals from other sectors are spread and appear as wideband interference. However, the signals from other sectors or cells are not orthogonal to each other. The non-orthogonal interference from adjacent sectors or cells can degrade the performance of the communication system.

In an IS-95 CDMA communication system, a pilot channel is transmitted on the forward link to assist the remote station perform coherent demodulation of the received signal. Coherent demodulation results in improved performance. For each beam, a pilot channel is utilized. In accordance with the IS-95 standard, the pilot channel is covered with Walsh sequence zero.

A number of challenges arise when attempting to increase the capacity of the CDMA system. First, the Walsh sequences available for covering the code channels is defined by the IS-95 standard and limited to 64. Second, a method is desired to allow the remote stations to distinguish the different beams, sectors, or picocells in CDMA systems with minimal signal processing. And third, maintaining conformance to the IS-95 standard is a desirable condition. The present invention addresses these challenges.

SUMMARY OF THE INVENTION

The present invention is a novel and improved method and apparatus for providing orthogonal spot beams, sectors, and picocells. The transmissions can be made orthogonal by using orthogonal auxiliary pilots and different Walsh traffic channels in adjacent areas. In accordance with the IS-95 standard, the pilot signal is covered with the 64-chip all zeros Walsh sequence. In the exemplary embodiment, the 64-chip all zeros Walsh sequence is designated as P and the 64-chip all ones sequence is designated as M. In the present invention, additional pilot signals can be provided by concatenating the 64-chip all zeros P and all ones M sequences. For two pilot signals, pilot Walsh sequences of PP and PM can be used. For four pilot signals, pilot Walsh sequences of PPPP, PMPM, PPMM, and PMMP can be used. The present invention can be extended such that K pilot Walsh sequences can be generated by substituting each bit in an K-bit Walsh sequence with the 64-chip all zeros P or all ones M sequence depending on the value of that bit. Using this method, K pilot Walsh sequences can be generated from the basic all zeros P and all ones M sequences, where K is a number which is a power of two.

It is an object of the present invention to provide orthogonal spot beams, sectors, and picocells. In the exemplary embodiment, the traffic channels in a transmission area are covered with Walsh sequences which are orthogonal to those of adjacent areas. In addition, the pilot for each transmission area is covered with pilot Walsh sequence which is derived from Walsh sequence zero. Orthogonal traffic channels and pilots minimize interference and improve capacity.

It is another object of the present invention to provide additional orthogonal pilot channels without reducing the number of orthogonal Walsh channels available for traffic and control channels. In accordance with the IS-95 standard, 64 Walsh sequences are available for covering 64 code channels. Walsh sequence zero is reserved for the pilot channel and the remaining 63 Walsh sequences can be used for other code channels, such as traffic channels and control channels. In the present invention, the additional pilot signals are generated using concatenated combinations of the all zeros and all ones sequences. All pilot signals are orthogonal to each other and to the remaining Walsh sequences. The remaining 63 Walsh sequences are still available for system use.

It is yet another object of the present invention to provide an efficient mechanism to search and distinguish the pilot signals of different beams, sectors, and picocells in CDMA systems. In the exemplary embodiment, the pilot signals are spread using the same short spreading sequence. The remote station is able to despread all pilot signals using the same short despreading sequence. For each 64-chip interval, the length of the basic Walsh sequence, the despread signal is decovered with Walsh sequence zero to provide I and Q pilot values. For each pilot signal hypothesis, the I and Q pilot values obtained from the present and previous 64-chip intervals are combined in accordance with the hypothesis and the decovered pilot is compared against predetermined thresholds. Since all pilot signal hypotheses can be computed from the common set of I and Q pilot values, the signal processing to receive and distinguish the pilot signals from different beams, sectors, and picocells can be easily performed.

It is another object of the present invention to provide an efficient mechanism to add and drop beams, sectors, and picocells from the active and/or candidate sets of the remote station. In the exemplary embodiment, each remote station maintains an active set comprising the list of beams, sectors, and picocells with which the remote station is in active communication. In the exemplary embodiment, each remote station also maintains a candidate set comprising the list of beams, sectors, and picocells from which the energy of the received pilot signals exceed a predetermined threshold. The energy of the received pilot signals can be computed from the decovered pilot. If the energy is above an add threshold, the spot beam, sector, or picocell corresponding to this pilot signal can be added to the active/candidate set of the remote station. Alternatively, if the energy is below a drop threshold, the spot beam, sector, or picocell corresponding to this pilot signal can be removed from the active/candidate set.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1A:
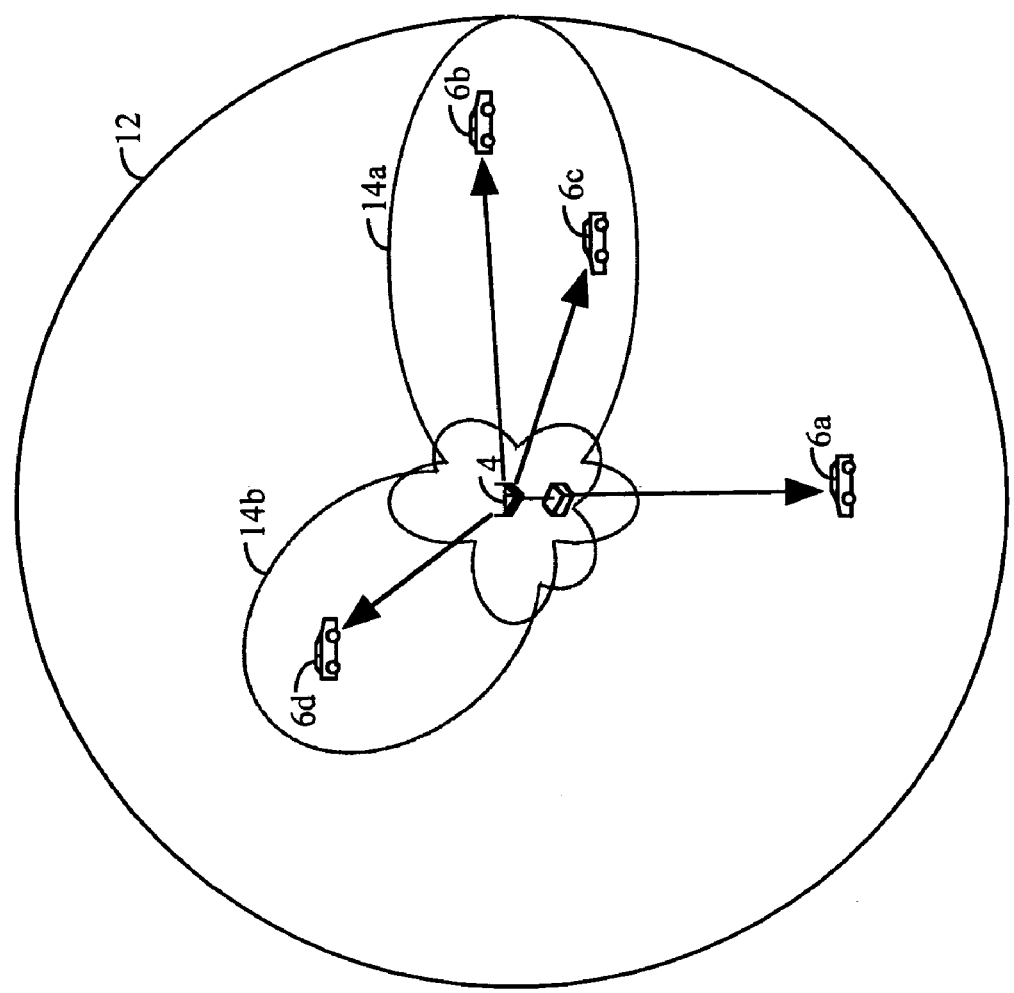
FIG. 1A is a diagram of an exemplary CDMA cell comprising a wider beam and a plurality of spot beams.

The present invention is a method and apparatus for providing orthogonal spot beams, sectors, and picocells. In accordance with the IS-95 standard, the forward link comprises 64 orthogonal code channels which are generated by covering each code channel with one of 64 unique Walsh sequences. In accordance with the IS-95 standard, Walsh sequence zero is reserved for the pilot signal. To increase capacity, the forward link transmission can comprise multiple transmissions. Each transmission can be directed to a particular area by the use of directive antennas. For example, a transmission can be directed at the entire area surrounding the base station (e.g., an omni-directional transmission), a sector of a cell, or a localized area within a sector or a cell using spot beams or picocells. Spot beams provide antenna gain, minimize interference, and increase capacity. In this specification, a particularized transmission comprises a transmission covering a cell, a sector, or a picocell and a directive transmission using a wider beam, a spot beam, or other directive beams.

For coherent demodulation, the phase of a pilot signal is used to demodulate the received signal. In the exemplary embodiment, one pilot signal is transmitted with each particularized transmission. In the exemplary embodiment, to minimize interference to adjacent area, transmissions are provided through orthogonal channels. However, the number of Walsh sequences available for covering code channels is fixed for an IS-95 system. A method and apparatus is required to provide additional orthogonal pilot channels, as required by beams, orthogonal sectors, and picocells without utilizing pre-exiting Walsh sequences since that would reduce the number of available Walsh sequences which can be used to cover traffic and control channels. In addition, maintaining capability with the IS-95 standard is an important consideration.

In accordance with the IS-95 standard, each Walsh sequence is 64 chips in duration. Furthermore, the Walsh sequence reserved for the pilot channel is the all zeros sequence. In the present invention, the additional orthogonal pilot channels are provided by concatenating the all ones and all zeros sequences. The all ones and all zeros sequences are orthogonal to all other Walsh sequences. The additional longer pilot Walsh sequences provided by the present invention are orthogonal to each other and the other 64-chip non-pilot Walsh sequences.

In the exemplary embodiment, the 64-chip all zeros Walsh sequence is designated as P and the 64-chip all ones sequence is designated as M. In the present invention, additional orthogonal pilot Walsh sequences can be provided by concatenating sequences of P and M. For example, two pilot channels can be provided by using 128-chip pilot Walsh sequences obtained with a 2-bit type of Walsh code mapping of P and M. Thus, pilot Walsh sequences of PP and PM can be used. The PM pilot Walsh sequence comprises a 64-bit all zeros sequence immediately followed by a 64-bit all ones sequence. Similarly, four pilot channels can be provided by using 256-chip pilot Walsh sequences obtained with a 4-bit type of Walsh code mapping of P and M. Thus, pilot Walsh sequences of PPPP, PMPM, PPMM, and PMMP can be used. The PMPM pilot Walsh sequence comprises a 64-bit all zeros sequence immediately followed by a 64-bit all ones sequence immediately followed by a 64-bit all zeros sequence and immediately followed by a 64-bit all ones sequence. The concept can be further extended to provide K pilot channels using correspondingly longer (e.g., 64·K) pilot Walsh sequences. In the exemplary embodiment, the all zeros sequences (e.g., PP and PPPP) are reserved for the "original" pilot channel (e.g., for the wider beam or the omni-directional transmission) to maintain compliance with the IS-95 standard.

Many benefits are provided by the pilot channels generated in accordance with the present invention. First, the number of Walsh sequences available for other code channels is not affected (or reduced) by the additional pilot channels. Second, in the exemplary embodiment, the same short PN offset is utilized for all pilot channels so that searching for pilot signals of spot beams, sectors, and picocells is simplified. Third, the addition or removal of beams, sectors, or picocells to or from the active and/or candidate sets of a remote station is simplified. And finally, the interference of the pilot channel to adjacent areas is minimal since the pilot channels are orthogonal. The interference of traffic channels is also minimal if the traffic channels in the adjacent areas use different Walsh channels. These benefits are described below.

Referring to the figures, FIG. 1A is a diagram of an exemplary CDMA cell. The forward link transmission from base station 4 to remote station 6 can comprise wider beam (or omni-directional beam) 12 and spot beams 14a and 14b. As shown in FIG. 1A, spot beams 14 can be directed at different geographic coverage areas and can have different sizes. Spot beams 14 can be used to increase capacity and improve performance. Base station 4 can transmit to zero or more remote stations 6 within any beam. For example, in FIG. 1A, base station 4 transmits to remote station 6a using wider beam 12, to remote stations 6b and 6c using spot beam 14a, and to remote station 6d using spot beam 14b.

Figure 1B:
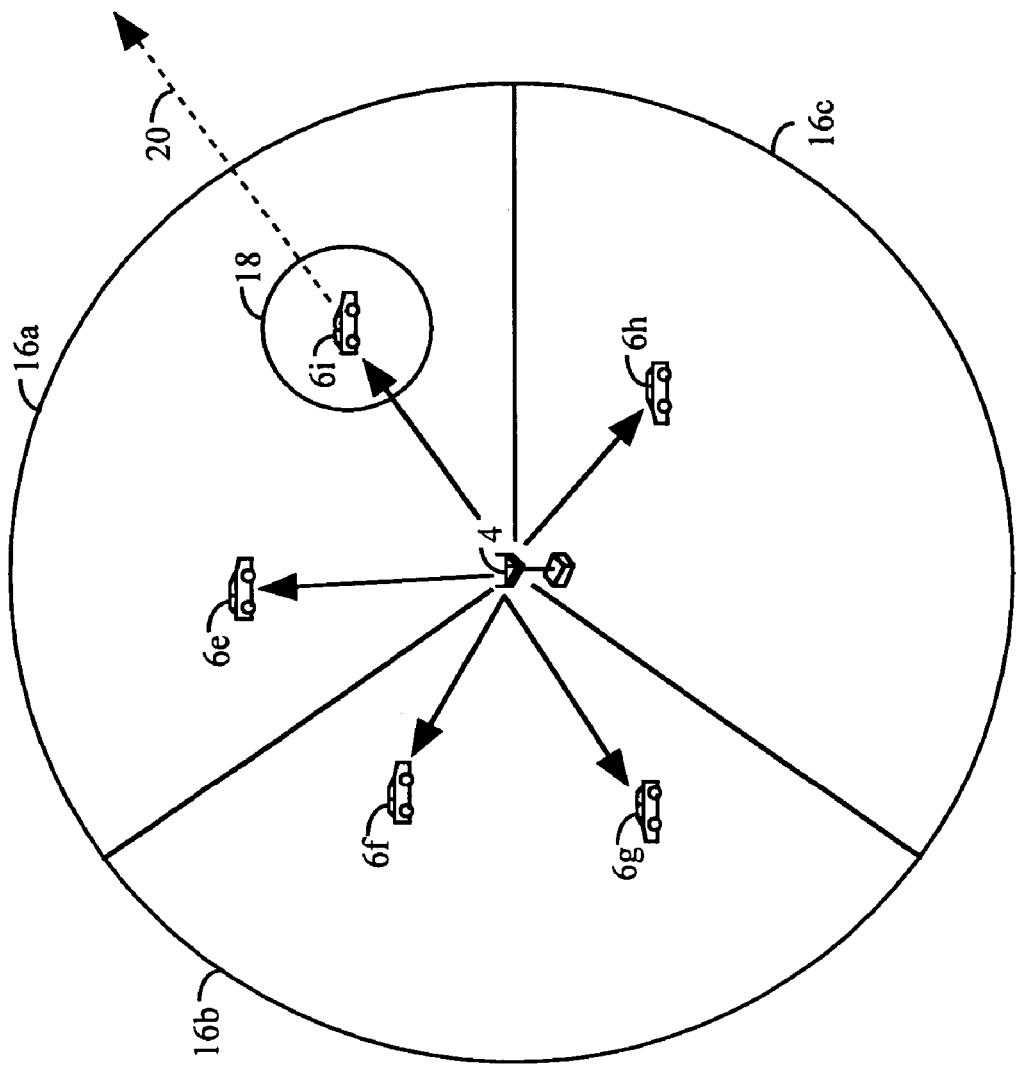
FIG. 1B is a diagram of an exemplary CDMA cell comprising three sectors and a picocell.

FIG. 1B is a diagram of another exemplary CDMA cell. The CDMA cell can be partitioned into sectors 16 in the manner described in the aforementioned U.S. Pat. No. 5,621,752. Picocell 18 is a localized transmission which is embedded within sector 16a. As shown in FIG. 1B, base station 4 can transmit to zero or more remote stations 6 within any sector 16 or picocell 18. For example, in FIG. 1B, base station 4 transmits to remote station 6e in sector 16a, to remote stations 6f and 6g in sector 16b, to remote station 6h in sector 16c, and to remote station 6i in sector 16a and picocell 18.

Figure 2:
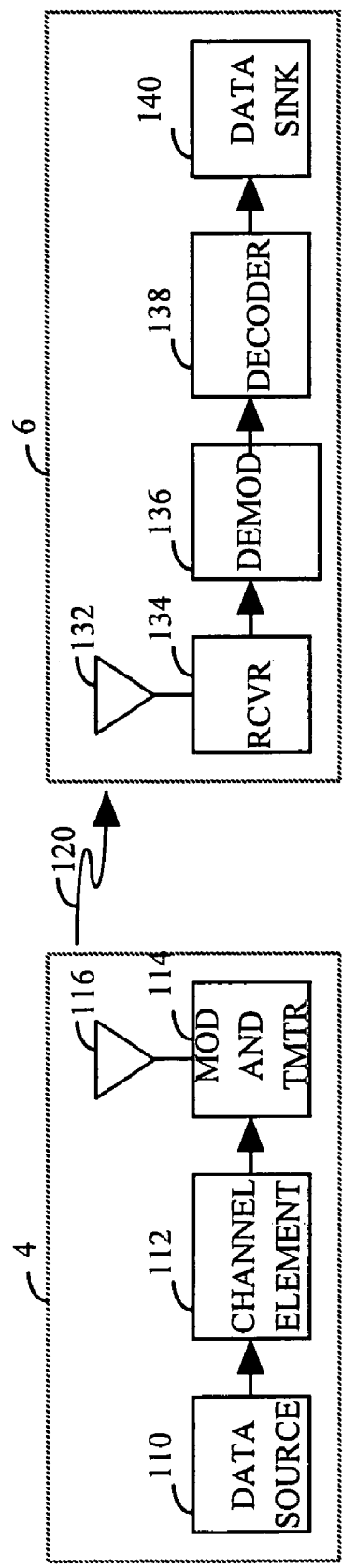
FIG. 2 is a block diagram of an exemplary forward link transmission and receiving subsystem of the present invention.

A block diagram of an exemplary forward link transmission and receiving hardware is shown in FIG. 2. Within base station 4, data source 110 contains the data to be transmitted to remote station 6. The data is provided to channel element 112 which partitions the data, CRC encodes the data, and inserts code tail bits as required by the system. Channel element 112 then convolutionally encodes the data, CRC parity bits, and code tail bits, interleaves the encoded data, scrambles the interleaved data with the user long PN sequence, and covers the scrambled data with a Walsh sequence. The traffic channel and pilot channel data corresponding to each particularized transmission (e.g., each spot beam, sector, or picocell) is combined and provided to a modulator and transmitter (MOD AND TMTR) 114 (only one is shown in FIG. 2 for simplicity). Each modulator and transmitter 114 spreads the covered data with the short $PN_I$ and $PN_Q$ sequences. The spread data is then modulated with the in-phase and quadrature sinusoids, and modulated signal is filtered, upconverted, and amplified. The forward link signal is transmitted on forward link 120 through antenna 116.

At remote station 6, the forward link signal is received by antenna 132 and provided to receiver (RCVR) 134. Receiver 134 filters, amplifies, downconverts, quadrature demodulates, and quantizes the signal. The digitized data is provided to demodulator (DEMOD) 136 which despreads the data with the short $PN_I$ and $PN_Q$ sequences, decovers the despread data with the Walsh sequence, and derotates the decovered data with the recovered pilot signal. The derotated data from different correlators within demodulator 136 are combined and descrambled with the user long PN sequence. The descrambled (or demodulated) data is provided to decoder 138 which performs the inverse of the encoding performed within channel element 112. The decoded data is provided to data sink 140.

Figure 3:
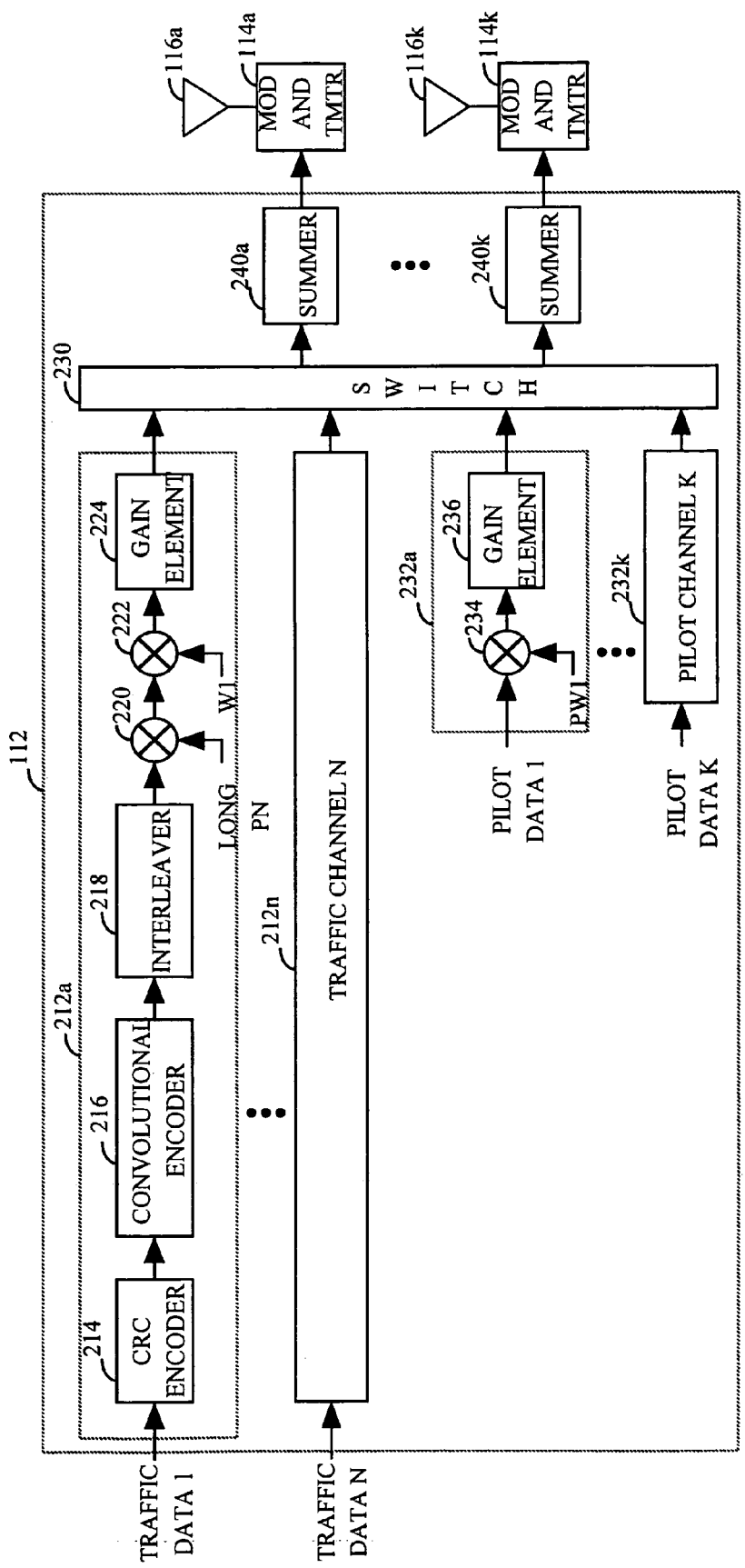
FIG. 3 is a block diagram of an exemplary channel element within the base station.

A block diagram of an exemplary channel element 112 is shown in FIG. 3. In the exemplary embodiment, channel element 112 comprises at least one traffic channel (or code channel) 212 and at least one pilot channel 232. Within each traffic channel 212, CRC encoder 214 receives the traffic data, performs CRC encoding, and can insert a set of code tail bits in accordance with the IS-95 standard. The CRC encoded data is provided to convolutional encoder 216 which encodes the data with a convolutional code. In the exemplary embodiment, the convolutional code is specified by the IS-95 standard. The encoded data is provided to interleaver 218 which reorders the code symbols within the encoded data. In the exemplary embodiment, interleaver 218 is a block interleaver which reorders the code symbols within blocks of 20 msec of encoded data. The interleaved data is provided to multiplier 220 which scrambles the data with the user long PN sequence. The scrambled data is provided to multiplier 222 which covers the data with the Walsh sequence assigned to this traffic channel 212. The covered data is provided to gain element 224 which scales the data such that the required energy-per-bit-to-noise $E_b/I_0$ ratio is maintained at remote station 6 while minimizing transmit power. The scaled data is provided to switch 230 which directs the data from traffic channel 212 to the proper summer 240. Summers 240 sum the signals from all traffic channels 212 and pilot channel 232 designated for a particularized transmission. The resultant signal from each summer 240 is provided modulator and transmitter 114 which functions in the manner described above.

Channel element 112 comprises at least one pilot channel 232. The number of pilot channels 232 required is dependent on the system requirements. For each pilot channel 232, the pilot data is provided to multiplier 234 which covers the data with a pilot Walsh sequence. In the exemplary embodiment, the pilot data for all pilot channels 232 are identical and comprises the all ones sequence. The covered pilot data is provided to gain element 236 which scales the pilot data with a scaling factor to maintain the required pilot signal level. The scaled pilot data is provided to switch 230 which directs the data from pilot channel 232 to the proper summer 240.

The hardware as described above is one of many embodiments which support multiple particularized transmissions from base station 4. Other hardware architectures can also be designed to perform the functions described herein. These various architectures are within the scope of the present invention.

In the exemplary embodiment, the Walsh sequence provided to each traffic channel 212 is a 64-bit Walsh sequence as defined by the IS-95 standard. In the exemplary embodiment, Walsh sequence zero is reserved for the pilot channels. In the exemplary embodiment, the pilot Walsh sequence provided to each pilot channel 232 is generated from concatenation of the 64-bit all zeros and all ones sequences. The number of pilot channels required determines the minimum length of the pilot Walsh sequences. In the exemplary embodiment, for two pilot channels, the length of the pilot Walsh sequence is 128 bits and for four pilot channels, the length of the pilot Walsh sequence is 256 bits. The length of the pilot Walsh sequence can be generalized as 64·K, where K is the number of pilot channels required by base station 4 and is a power of two. For four pilot channels, the pilot Walsh sequences can be PPPP, PMPM, PPMM, and PMMP, where P and M are defined above.

In the exemplary embodiment, a pilot signal is transmitted with each particularized transmission. Referring to FIG. 1A, spot beams 14a and 14b require transmission of two addition pilot signals. Additional transmit power is required for the additional pilot signals. However, because of higher antenna gain associated with the directivity of spot beams 14, the required transmit power for the pilot signal and forward link signal for each spot beam 14 is reduced by the antenna gain. Thus, higher capacity can be achieved even in the presence of additional transmissions of the pilot signals. In fact, in the present invention, the transmit power of the forward traffic channels and pilot channel can be adjusted (possibly dynamically) in accordance with the directivity of the particularized transmission (e.g., the antenna gain of the spot beam).

Figure 4:
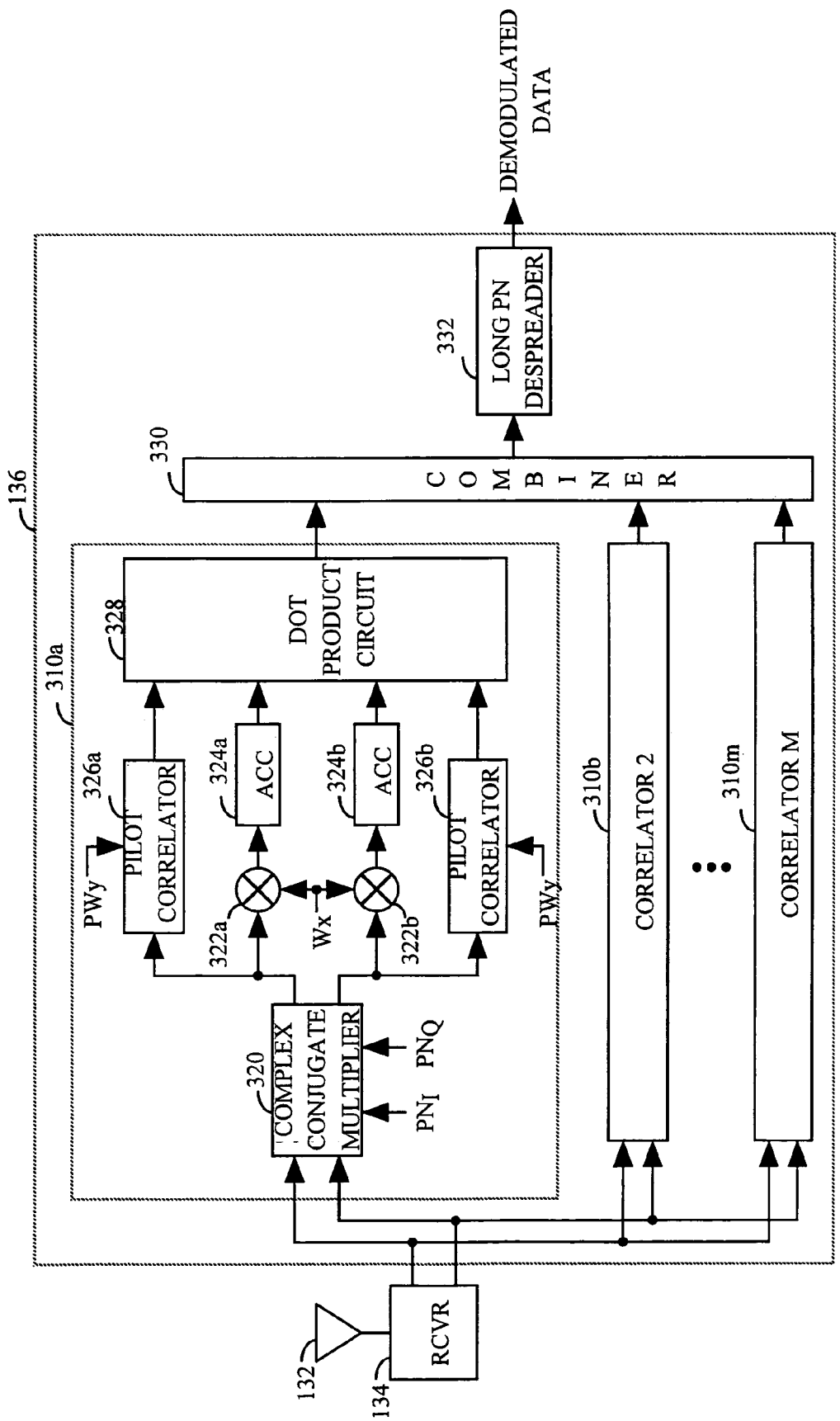
FIG. 4 is block diagram of an exemplary demodulator within the remote station.

A block diagram of an exemplary demodulator within remote station 6 is shown in FIG. 4. The forward link signal is received by antenna 132 and provided to receiver 134 which processes the signal in the manner described above. The digitized I and Q data is provided to demodulator 136. Within demodulator 136, the data is provided to at least one correlator 310. Each correlator 310 processes a different multipath component of the received signal. Within correlator 310, the data is provided to complex conjugate multiplier 320 which multiplies the I and Q data with the short $PN_I$ and $PN_Q$ sequences to obtain the despread I and Q data. The complex conjugate multiplier removes the spreading performed by the complex multiplier within modulator and transmitter 114.

The despread I and Q data is provided to multipliers 322a and 322b and pilot correlators 326a and 326b, respectively. Multipliers 322a and 322b multiply the I and Q data with the Walsh sequence (Wx) assigned to that correlator 310. The I and Q data from multipliers 322a and 322b is provided to accumulators (ACC) 324a and 324b, respectively. In the exemplary embodiment, accumulators 324 accumulate the data over the 64-chip interval, the length of the Walsh sequence. The decovered I and Q data from accumulators 324 is provided to dot product circuit 328. Pilot correlators 326a and 326b decover the I and Q data with the pilot Walsh sequence (PWy) assigned to that correlator 310 and filter the decovered pilot signal. The operation of pilot correlators 326 is described below. The filtered pilot is provided to dot product circuit 328. Dot product circuit 328 computes the dot product of the two vectors (the pilot and data) in a manner known in the art. An exemplary embodiment of dot product circuit 328 is described in detail in U.S. Pat. No. 5,506,865, entitled "PILOT CARRIER DOT PRODUCT CIRCUIT", assigned to the assignee of the present invention and incorporated by reference herein. Dot product circuit 328 projects the vector corresponding to the decovered data onto the vector corresponding to the filtered pilot, multiplies the amplitude of the vectors, and provides a signed scalar output to combiner 330. Combiner 330 combines the outputs from correlators 310 which have been assigned to demodulate the received signal and routes the combined data to long PN despreader 332. Long PN despreader 332 despreads the data with the long PN sequence and provides the demodulated data to decoder 138.

The operation of pilot correlator 326 is described as follows. In the exemplary embodiment, the pilot signals from particularized transmissions are spread with the same short PN sequence but covered with different pilot Walsh sequences. For each sequence interval, which is 64-chip in duration for the exemplary IS-95 Walsh sequence, the pilot signals from the in-phase and quadrature channels are accumulated and stored as the I and Q pilot values, respectively. The I and Q pilot values for the current sequence interval are combined with the I and Q pilot values for previous sequence intervals in accordance with the pilot hypothesis being searched. As an example, assume that $I_0$ and $Q_0$ are the pilot values accumulated for the current sequence interval, and $I_1$ and $Q_1$, $I_2$ and $Q_2$, and $I_3$ and $Q_3$ are the pilot values accumulated for the immediately prior three sequence intervals. Then, for the PPPP pilot hypothesis, the decovered pilot comprises $I_{d,PPPP}=I_0+I_1+I_2+I_3$ and $Q_{d,PPPP}=Q_0+Q_1+Q_2+Q_3$. Similarly, for the PMPM pilot hypothesis, the decovered pilot comprises $I_{d,PMPM}=I_0-I_1+I_2-I_3$ and $Q_{d,PMPM}=Q_0-Q_1+Q_2-Q_3$. Thus, the decovered pilot for all pilot hypotheses can be calculated from the one set of I and Q pilot values. The energy of the decovered pilot can be computed as $E_p=I_d^2+Q_d^2$.

Many benefits are provided by the pilot channels generated in accordance with the present invention. First, the number of Walsh sequences available for other code channels is not affected (or reduced) since 63 are still available for the traffic channels and only Walsh sequence zero is used for the pilot channels. This is particularly important when capacity, in terms of the number of remote stations supportable by base station 4, is sought to be increased with minimal changes to the CDMA architecture as defined by the IS-95 standard.

Second, in the exemplary embodiment, the same short PN offset is utilized for all pilot channels so that searching for and distinguishing pilot signals from particularized transmissions are simplified. In the prior art sectored cell, the pilot signal of each sector is spread with short PN sequences having different offsets. At remote station 6, a search of the pilot signals requires despreading the received signal with different short PN sequences, each having a different offset corresponding to that of the sector. In the exemplary embodiment, the pilot signals of particularized transmissions are spread with the same short PN sequences but covered with different pilot Walsh sequences. Thus, the pilot signal is only despread once and the decovered pilot for different pilot hypotheses can be computed from the common set of I and Q pilot values as described above.

Third, the addition or removal of spot beams, sectors, and picocells to or from the active set and/or the candidate set of remote station 6 is simplified by the present invention. In the exemplary embodiment, remote station 6 can treat the pilot signals covered with the pilot Walsh sequence in a manner similar to those from other sectors and cells. Specifically, the set of active and candidate pilots can be maintained by comparing the energy obtained by the searcher pilot correlator 326 with a set of predetermined thresholds. If the energy $E_p$ of the pilot signal is above an add threshold, the particularized transmission corresponding to this pilot signal can be added to the active/candidate set of remote station 6. Alternatively, if the energy $E_p$ of the pilot signal is below a drop threshold, the particularized transmission corresponding to this pilot signal can be removed from the active/candidate set. Similarly, handoff between particularized transmissions can be handled in a manner similar to that performed in IS-95 systems.

I. Auxiliary Pilots for Sectored Cells

The present invention can be utilized to provide improved performance for sectored cells. In accordance with the IS-95 standard, each sectored cell uses a different PN offset of a common PN sequence on the forward link. This architecture does not provide forward link signals which are orthogonal to each other and this can limit the performance of the link. For example, if remote station 6 is close to base station 4, the path loss is small. This enables transmissions of high rate data over the link. However, if remote station 6 is between two sectors, remote station 6 receives a considerable amount of non-orthogonal signal interference. This non-orthogonal signal interference, rather than thermal noise, limits the maximum data rate that the link can support. If the sectors transmit signals that are orthogonal to each other, the other-sector signal interference is minimized and transmissions at higher data rates are possible with just thermal noise and some residual non-orthogonal signal interference. With orthogonal signals, performance in the areas covered by more than one antenna is also improved by the diversity provided by the multiple paths.

The orthogonal signals are provided by using different orthogonal auxiliary pilots for the sectors, using different Walsh traffic channels for the traffic in adjacent sectors, and minimizing the time difference between the signals received from the adjacent sectors. This time difference can be accomplished by using sector antennas that are in close proximity to each other so that the path delay between the antennas is smaller than the chip period. The timing of the sectors can also be adjusted to compensate for time differences.

II. Auxiliary Pilots for Picocells

The present invention can be used to provide additional pilots for picocells. The picocell can comprise a localized coverage area which can be used to provide additional services. The picocell can reside (or be embedded) within a macrocell and the macrocell can be a cell, a sector, or a beam. In one implementation, the picocell can be implemented using different transmission frequencies. However, this may not be feasible or economically practical. The present invention can be use to provide separate pilots for picocells.

In the exemplary embodiment, a set of Walsh sequences which are not used by the macrocell can be used by the picocell. In the exemplary embodiment, the picocell aligns its transmit timing to that of the macrocell. This can be accomplished by one of many embodiments. In the exemplary embodiment, a receiver at the picocell receives the forward link signals from the picocell and the macrocell and adjusts the timing of the picocell so that it is aligned with that of the macrocell. After time alignment of the transmissions of the picocell with those of the macrocell, the transmissions from the picocell can be made orthogonal to those of the macrocell at the center of the picocell by using orthogonal auxiliary pilots and different Walsh traffic channels for the data in the cells.

Figure 5:
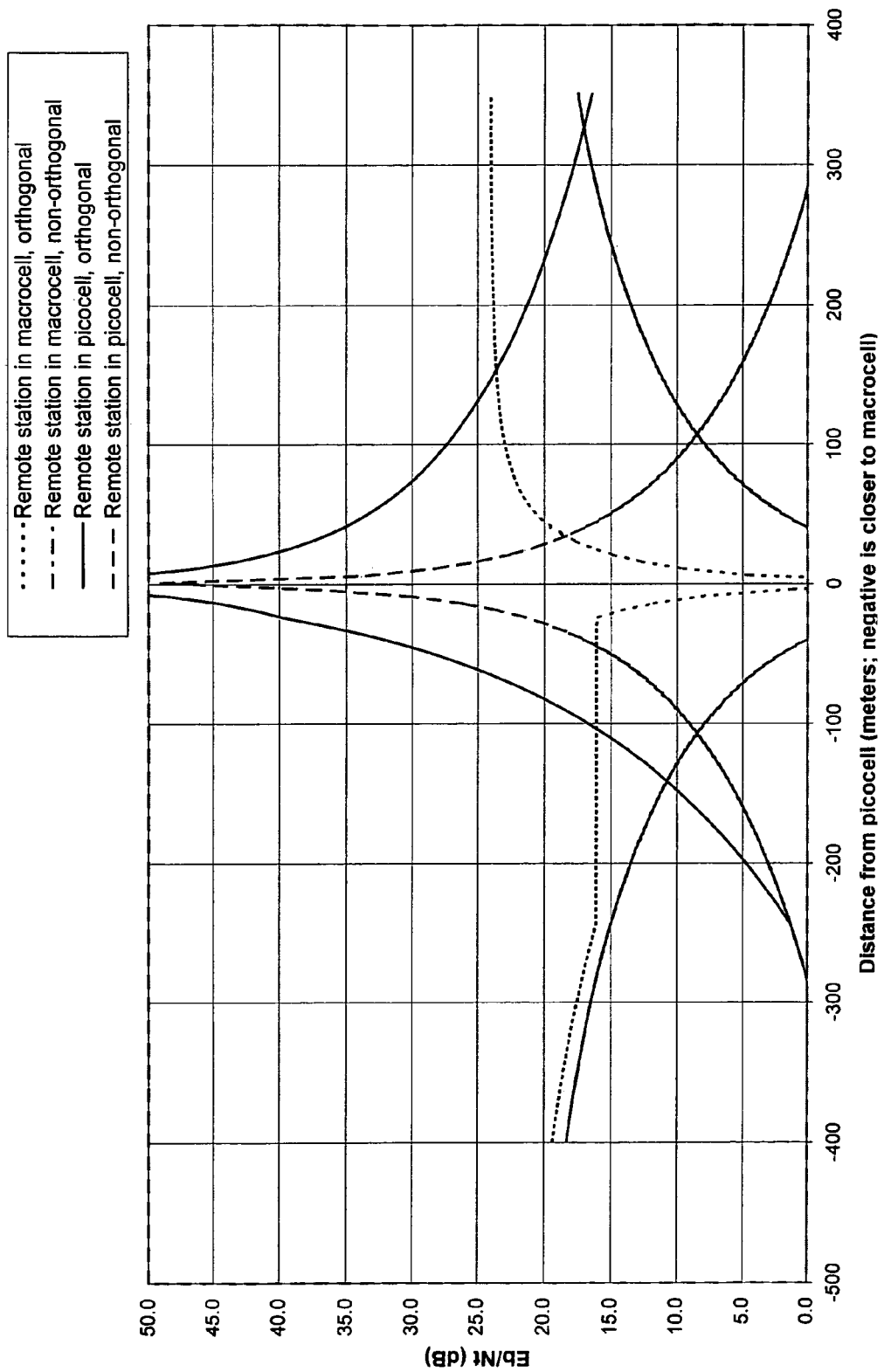
FIG. 5 is a block diagram of EB/Nt with respect to the Distance from picocell.

A diagram a picocell 18 embedded within a macrocell (or sector 16a) is shown in FIG. 1B. Line 20 passes through the center of picocell 18. A diagram of the energy-per-bit-to-total-interference-density ratio, $E_b/N_t$, of a remote station 6 along line 20 is shown in FIG. 5. In FIG. 5, the $E_b/N_t$ of a picocell which radiates in a manner which is orthogonal to the macrocell and a picocell which does not radiate orthogonally to the macrocell are shown.

FIG. 5 shows that there is only a small degradation from the orthogonal picocell to the macrocell user (or remote station) when the macrocell user enters the picocell. Note that there is a dramatic drop in $E_b/N_t$ when the remote station in the macrocell is almost at the same location as the picocell. This is due to the very strong signal from the picocell and the assumption that the picocell and macrocell cannot be made perfectly orthogonal. In FIG. 5, it is assumed that there is a minimum coupling from the picocell to the macrocell. In the exemplary embodiment, this minimum coupling is given as 0.01. Thus, at least 1% of the picocells power is non-orthogonal to that of the macrocell. However, if the picocell is non-orthogonal, the remote station in the macrocell receives a substantial amount of power from the picocell. FIG. 5 shows that if the remote station is within about 40 meters of the picocell, the macrocell has to transmit a considerable amount of power in order to maintain the communication with the remote station. With an orthogonal picocell, the region where the macrocell has to transmit a lot of power drops to just a couple of meters. Similarly, there is a substantial range increase for the picocell user by having the picocell radiate orthogonally to the macrocell. The example in FIG. 5 shows that the range increases by about 50% when the remote station is closer to the macrocell and increases substantially more in the other direction.

FIG. 5 shows the effect along line 20 going through picocell 18. However, if the mobile station is not on line 20, the performance can be calculated. For a given distance from the picocell, the performance will be bounded between that given for the remote station at the same distance, but on line 20 and being closer to the macrocell and further from the macrocell.

The present invention has been described in the context of Walsh sequence zero which is reserved for the pilot channel in IS-95 systems. Other Walsh sequences can also be used to generated the pilot Walsh sequences of the present invention. The selected Walsh sequence and its complementary sequence can be used to generate the pilot Walsh sequences in the manner described above. In the exemplary embodiment, the complementary sequence is derived by inverting each bit in the selected Walsh sequence. Alternatively, the complementary sequence can be a second basic Walsh sequence. In summary, other basic Walsh sequences can be utilized and are within the scope of the present invention.

Although the present invention has be described in the context of a CDMA system which conforms to the IS-95 standard, the present invention can be extended to other communication systems. The pilot Walsh sequences can be generated from the basic Walsh sequence which, in the exemplary IS-95 system, is 64 chips in length. Basic Walsh sequences of different lengths can also be utilized and are within the scope of the present invention. Furthermore, any orthogonal sequence or approximate orthogonal sequence can also be used and are within the scope of the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of wireless communications, comprising:
   providing pilot data;
   covering said pilot data with a first Walsh sequence to generate a first pilot signal, wherein the first Walsh sequence comprises a first basic Walsh sequence concatenated with a complementary sequence of the first basic Walsh sequence; and
   covering said pilot data with a second Walsh sequence orthogonal to said first Walsh sequence to generate a second pilot signal, wherein the second Walsh sequence comprises a second basic Walsh sequence concatenated with a complementary sequence of the second basic Walsh sequence:
   wherein the method is performed by a base station.

2. The method as in claim 1 further comprising providing said second pilot signal for a particularized transmission to a particular area.

3. A method of wireless communications, the method comprising:
   receiving a pilot signal; and
   decovering said pilot signal with a sequence which includes a basic Walsh sequence concatenated with a complementary sequence of said basic Walsh sequence to recover pilot data from said pilot signal;
   wherein the basic Walsh sequence is one of a plurality of Walsh sequences that are available for covering code channels, and wherein the method is performed by a remote station.

4. The method as in claim 3 further comprising receiving said pilot signal from a particularized transmission directed at a particular area.

5. An apparatus for wireless communications, comprising:
   means for providing pilot data;
   means for covering said pilot data with a first Walsh sequence to generate a first pilot signal, wherein the first Walsh sequence comprises a first basic Walsh sequence concatenated with a complementary sequence of the first basic Walsh sequence; and
   means for covering said pilot data with a second Walsh sequence orthogonal to said first Walsh sequence to generate a second pilot signal, wherein the second Walsh sequence comprises a second basic Walsh sequence concatenated with a complementary sequence of the second basic Walsh sequence.

6. The apparatus as in claim 5 further comprising means for providing said second pilot signal for a particularized transmission to a particular area.

7. An apparatus for wireless communications, comprising:
   means for receiving a pilot signal; and
   means for decovering said pilot signal with a sequence which includes a basic Walsh sequence concatenated with a complementary sequence of said basic Walsh sequence to recover pilot data from said pilot signal, wherein the basic Walsh sequence is one of a plurality of Walsh sequences that are available for covering code channels.

8. The apparatus as in claim 7 further comprising means for receiving said pilot signal from a particularized transmission directed at a particular area.

9. An apparatus for wireless communications, comprising:
   a first multiplier configured to cover pilot data with a first Walsh sequence to generate a first pilot signal, wherein the first Walsh sequence comprises a first basic Walsh sequence concatenated with a complementary sequence of the first basic Walsh sequence; and
   a second multiplier configured to cover said pilot data with a second Walsh sequence orthogonal to said first Walsh sequence to generate a second pilot signal, wherein the second Walsh sequence comprises a second basic Walsh sequence concatenated with a complementary sequence of the second basic Walsh sequence.

* * * * *